United States Patent
Prijic et al.

(10) Patent No.: US 11,206,924 B2
(45) Date of Patent: Dec. 28, 2021

(54) COUNTERTOP AND METHOD FOR MAKING SAME

(71) Applicant: Safran Cabin Inc., Huntington Beach, CA (US)

(72) Inventors: Nevenka Prijic, Montreal (CA); Jean-Francois Forest, Montreal (CA); Laura Hoinville, Sainte-Anne-de-Bellevue (CA)

(73) Assignee: SAFRAN CABIN INC., Huntington Beach, CA (US)

( * ) Notice: Subject to any disclaimer, the term of this patent is extended or adjusted under 35 U.S.C. 154(b) by 203 days.

(21) Appl. No.: 16/288,685

(22) Filed: Feb. 28, 2019

(65) Prior Publication Data
US 2019/0281980 A1  Sep. 19, 2019

Related U.S. Application Data

(60) Provisional application No. 62/643,621, filed on Mar. 15, 2018.

(51) Int. Cl.
*A47B 77/02* (2006.01)
*B32B 7/12* (2006.01)
(Continued)

(52) U.S. Cl.
CPC ............ *A47B 77/022* (2013.01); *B29D 22/00* (2013.01); *B32B 7/12* (2013.01); *B32B 37/12* (2013.01);
(Continued)

(58) Field of Classification Search
CPC . A47B 77/022; E03C 1/14; E03C 1/18; E03C 1/33; B32B 38/0004; B33Y 80/00;
(Continued)

(56) References Cited

U.S. PATENT DOCUMENTS

| 6,083,339 A | 7/2000 | Peters |
| 6,702,918 B2 * | 3/2004 | Yang ..................... B29C 64/141 |
| | | 156/263 |
| 2009/0261067 A1 | 10/2009 | Dietrich |

FOREIGN PATENT DOCUMENTS

EP  1002482 A1  5/2000

OTHER PUBLICATIONS

Saneux Uses Builder Extreme 1000 to 3D Print, https://3dprintingindustry.com/news/saneux-uses-builder-extreme-1000-to-3d-print-11-scale-bathroom-prototypes-134950/ (Year: 2018).*

(Continued)

*Primary Examiner* — Mark A Osele
*Assistant Examiner* — Christopher C Caillouet
(74) *Attorney, Agent, or Firm* — Jeffer Mangels; Butler & Mitchell LLP; Brennan C. Swain, Esq.

(57) ABSTRACT

A countertop assembly and method of making same. The method includes obtaining at least first and second layers that each include first and second alignment openings defined therein, disposing adhesive onto the upper surface of the first layer or the bottom surface of the second layer, stacking the second layer on the first layer, aligning the first alignment openings and aligning the second alignment openings, inserting a first alignment rod through the aligned first alignment openings, inserting a second alignment rod through the aligned second alignment openings, allowing the adhesive to dry to form a countertop stack assembly, and machining the countertop stack assembly to remove at least a portion of a surface of the first layer and at least a portion of a surface of the second layer to form a finished countertop assembly.

6 Claims, 12 Drawing Sheets

(51) Int. Cl.
    *B32B 37/12* (2006.01)
    *B32B 37/18* (2006.01)
    *B32B 38/00* (2006.01)
    *E03C 1/18* (2006.01)
    *E03C 1/33* (2006.01)
    *B29D 22/00* (2006.01)
    *F16B 11/00* (2006.01)
    *E03C 1/14* (2006.01)

(52) U.S. Cl.
    CPC .......... *B32B 37/18* (2013.01); *B32B 38/0012* (2013.01); *E03C 1/18* (2013.01); *E03C 1/33* (2013.01); *E03C 1/335* (2013.01); *B32B 38/0004* (2013.01); *B32B 2479/00* (2013.01); *B32B 2509/00* (2013.01); *E03C 1/14* (2013.01); *F16B 11/006* (2013.01); *Y10T 156/108* (2015.01); *Y10T 156/1057* (2015.01)

(58) Field of Classification Search
    CPC ........... Y10T 156/108; Y10T 156/1057; B29C 65/7808; B29C 65/7805; B29C 65/7811; B29C 65/7814
    See application file for complete search history.

(56) References Cited

OTHER PUBLICATIONS 3D printed basin case study, https://3dprintingindustry.com/news/saneux-uses-builder-extreme-1000-to-3d-print-11-scale-bathroom-prototypes-134950/ (Year: 2018).*
Extended European Search Report issued in European Appln. 19163293.4.
Paisleygarbage: "Imgur: The magic of the Internet" Oct. 3, 2016 XP055595503, hhtp://imgur.com; retrieved from: URL: https://imgur.com.a/OK2v0 on Jun. 11, 2019.

* cited by examiner

COUNTERTOP AND METHOD FOR MAKING SAME

CROSS REFERENCE TO RELATED APPLICATIONS

This application claims the benefit of U.S. Provisional Application No. 62/643,621, filed Mar. 15, 2018, the entirety of which is incorporated herein by reference.

FIELD OF THE INVENTION

The present invention relates generally to a sink countertop, and more particularly to a sink countertop for an aircraft galley or lavatory and a method for making same.

BACKGROUND OF THE INVENTION

Typical countertops for airplane lavatories and galleys are molded. The molds can be expensive and difficult to build. They can also be difficult to customize and tailor to airline needs. Molding does not allow flexibility in terms of options and customization. As a result, sink shapes are all very similar due to this lack of flexibility. Therefore, a need exists for an improved countertop and a method for making it.

SUMMARY OF THE PREFERRED EMBODIMENTS

In accordance with a first aspect of the present invention there is provided a method of making an article of manufacture. The method includes obtaining at least first and second layers, disposing adhesive onto at least one of an upper surface of the first layer or a bottom surface of the second layer, and stacking the second layer on the first layer. The first layer includes at least first and second alignment openings defined therein, and the second layer includes at least a first and second alignment openings defined therein. The method also includes aligning the first alignment opening on the first layer with the first alignment opening on the second layer and aligning the second alignment opening on the first layer and the second alignment opening on the second layer, inserting a first alignment rod through the first alignment opening in the first layer and the first alignment opening in the second layer and inserting a second alignment rod through the second alignment opening in the first layer and the second alignment opening in the second layer, allowing the adhesive to dry to form a first stack assembly, and machining the first stack assembly to remove at least a portion of a surface of the first layer and at least a portion of a surface of the second layer to form a first finished assembly. The steps can also be performed by first inserting the first alignment rod through the first alignment opening in the first layer and inserting the second alignment rod through the second alignment opening in the first layer. Then, next, inserting the first alignment rod through the first alignment opening in the second layer and inserting the second alignment rod through the second alignment opening in the second layer to align the alignment openings.

In a preferred embodiment, the first layer includes at least first and second alignment members extending outwardly therefrom and the first and second alignment openings are defined in the first and second alignment members, respectively. The second layer includes at least first and second alignment members extending outwardly therefrom and the first and second alignment openings are defined in the first and second alignment members, respectively. Preferably, the method also includes machining the first stack assembly such that at least one of the first alignment member in the first layer, the first alignment member in the second layer, the second alignment member in the first layer or the second alignment member in the second layer is removed from the first stack assembly. All of the alignment members can be removed or one or more of them can remain for aligning with and attaching the assembly to another assembly, as described below. In a preferred embodiment, the method includes machining the first stack assembly such that at least one of the first alignment opening in the first layer, the first alignment opening in the second layer, the second alignment opening in the first layer or the second alignment opening in the second layer is removed from the first stack assembly.

In a preferred embodiment, the method includes obtaining at least third and fourth layers, disposing adhesive onto at least one of an upper surface of the third layer or a bottom surface of the fourth layer, and stacking the fourth layer on the third layer. The third layer includes at least first and second alignment openings defined therein, and the fourth layer includes at least a first and second alignment openings defined therein. The method also includes aligning the first alignment opening on the third layer with the first alignment opening on the fourth layer and aligning the second alignment opening on the third layer and the second alignment opening on the fourth layer, inserting a third alignment rod through the first alignment opening in the third layer and the first alignment opening in the fourth layer and inserting a fourth alignment rod through the second alignment opening in the third layer and the second alignment opening in the fourth layer, allowing the adhesive to dry to form a second stack assembly, machining the second stack assembly to remove at least a portion of a surface of the third layer and at least a portion of a surface of the fourth layer to form a second finished assembly, and securing the first finished assembly to the second finished assembly. Preferably, the method includes aligning the first alignment opening in the first layer of the first finished assembly with a third alignment opening on the second finished assembly.

In a preferred embodiment, the method includes inserting a fifth alignment rod through the first alignment opening in the first layer of the first finished assembly and the third alignment opening on the second finished assembly. The method can also include machining the first stack assembly such that at least one of the first alignment opening in the second layer, the second alignment opening in the first layer or the second alignment opening in the second layer is removed from the first stack assembly. Preferably, the second finished assembly includes a rim extending outwardly from a bottom surface thereof, and the third alignment opening is defined in the rim. An article of manufacture produced by the process described above is also within the scope of the present invention.

The present invention provides a method for making airplane lavatory and galley countertops, sinks, backsplashes, etc. and is best shown in the accompanying drawings. It will be appreciated that components of the lavatories and galleys beyond the countertops and backsplashes can be made using the same or a similar process. In another embodiment, a combination of molding and stacking (as described herein) can be used. Exemplary steps in the general process are as follows: Create the sink assembly by machining multiple parts from a sheet material and stack and glue parts using locating or alignment features. Create the backsplash by machining multiple parts from a sheet material and stack and glue parts using locating features. Machining, smoothing and or polishing the different assemblies and then securing them together to provide a final product.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-12 show a method for creating or making an article of manufacture that is comprised of a plurality of layers. In an exemplary embodiment, the article of manufacture is a countertop assembly that includes a sink, countertop and backsplash that can be used in aircraft lavatories and/or galleys. However, this is not a limitation on the present invention and the method described herein can be used to make other articles of manufacture. For ease of description, and as shown in the figures, the article of manufacture described herein is a countertop assembly 10 (see FIG. 9) that includes a countertop 12, backsplash 14 and sink 16.

Figure 1:
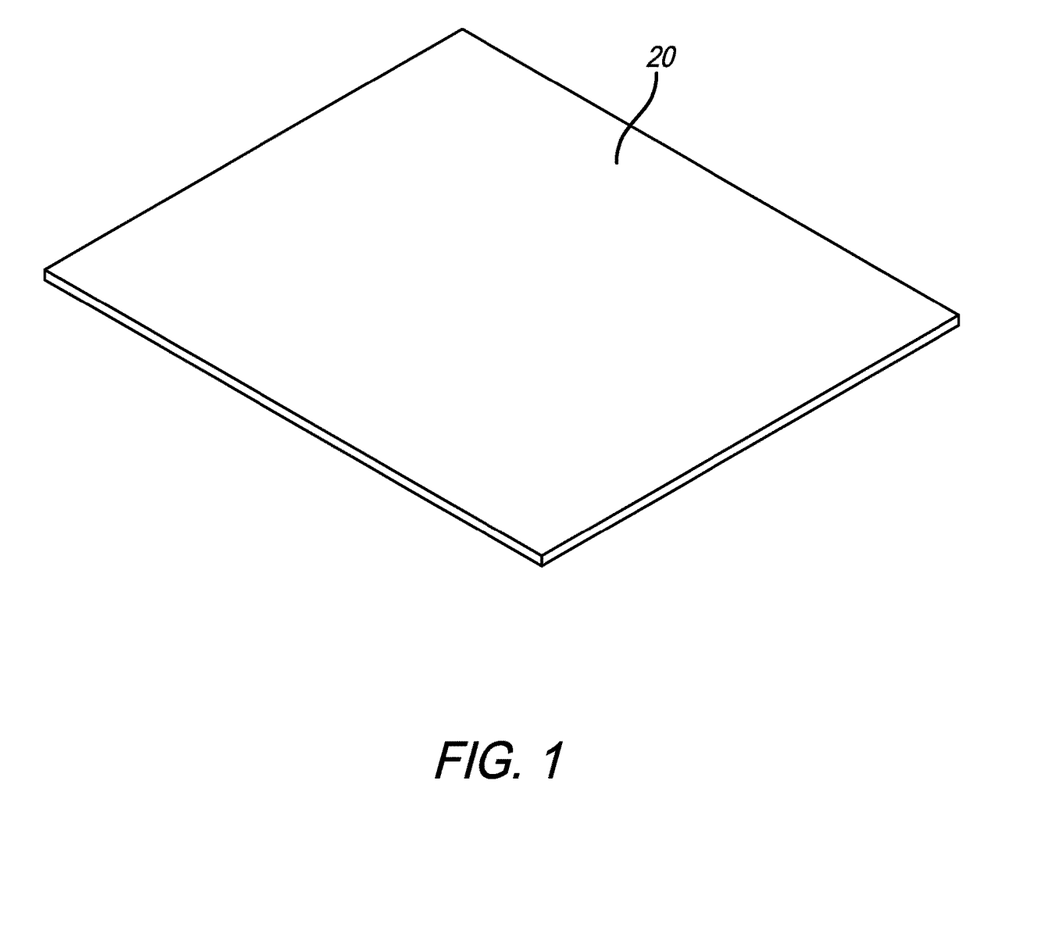
FIG. 1 is a perspective view of a sheet of material used in the method of the present invention.
Figure 2:
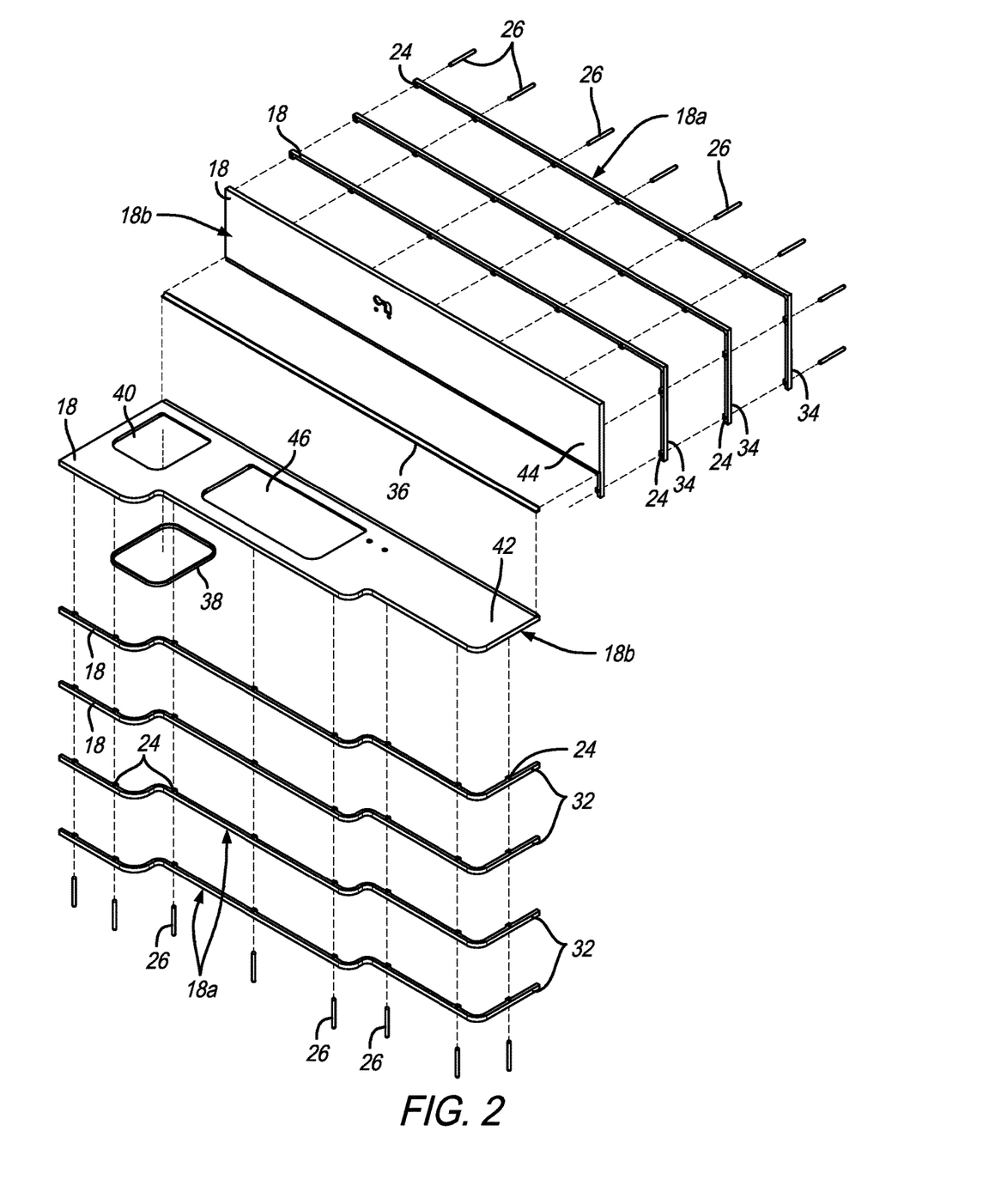
FIG. 2 is an exploded view of a plurality of layers used for making a countertop and backsplash assembly in accordance with a preferred embodiment.
Figure 3:
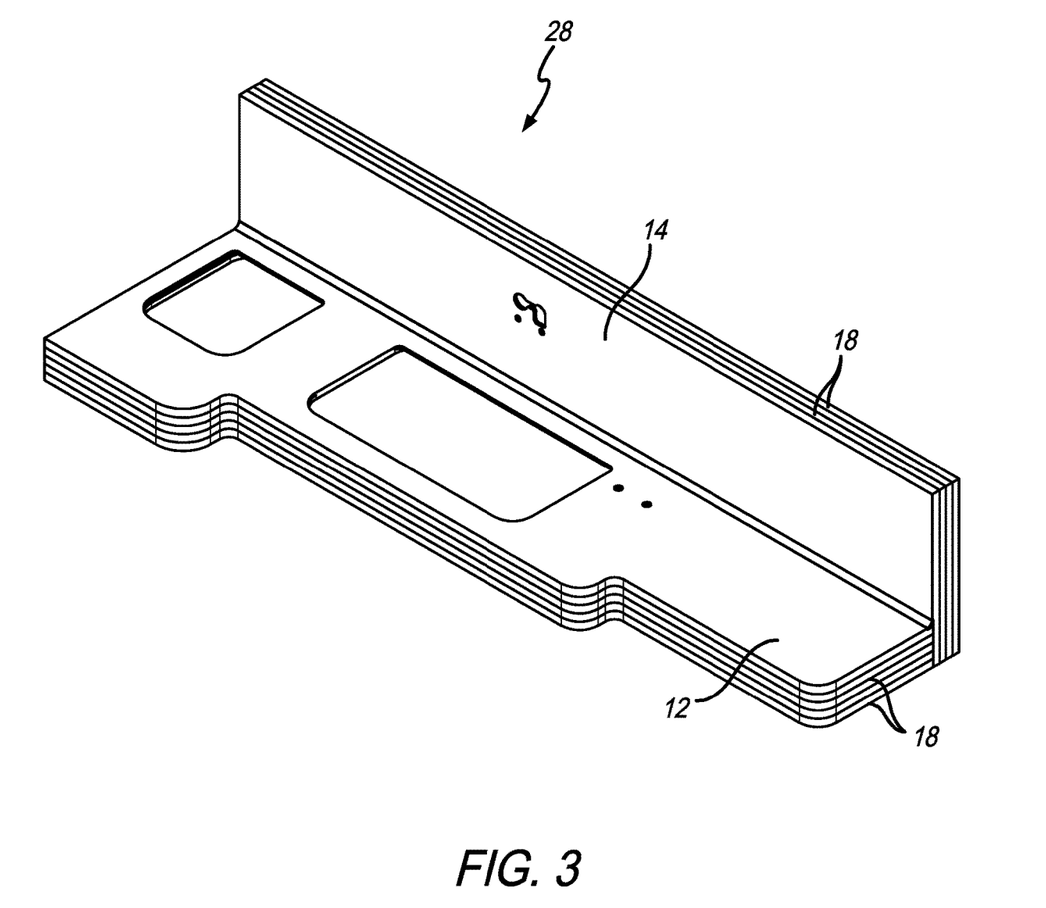
FIG. 3 is a perspective view of a stack assembly of the sink.
Figure 4:
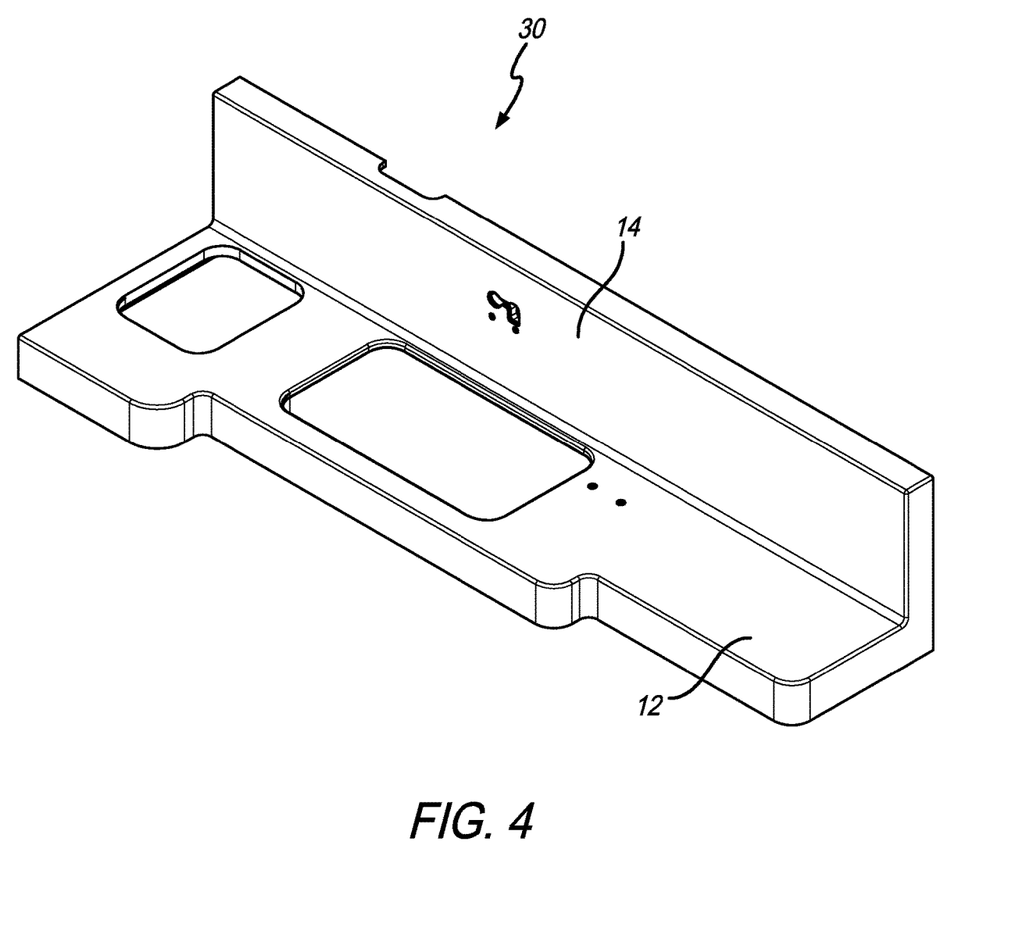
FIG. 4 is a perspective view of a finished assembly of the countertop and backsplash assembly.
Figure 5:
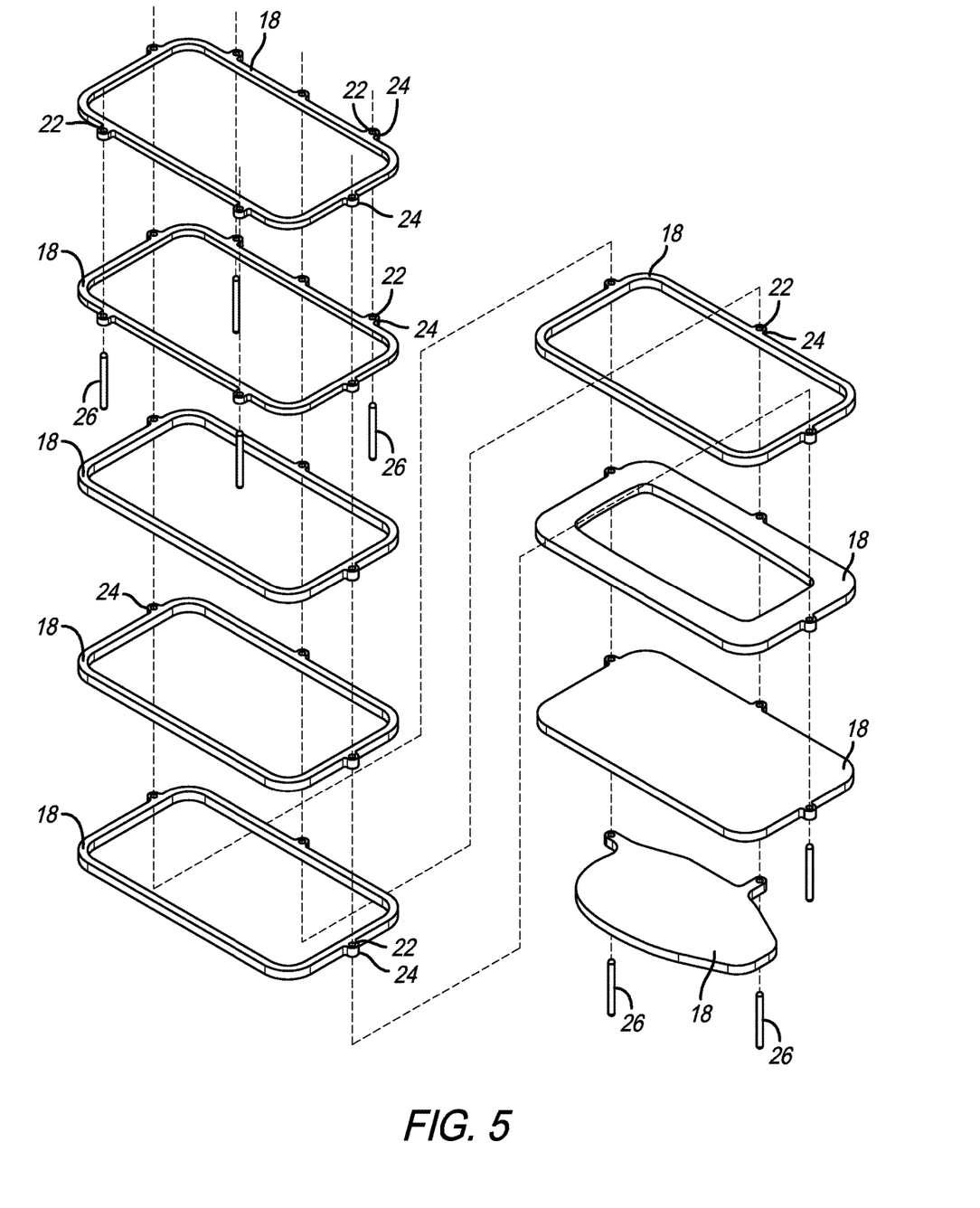
FIG. 5 is an exploded view of a plurality of layers used for making a sink in accordance with a preferred embodiment.
Figure 6:
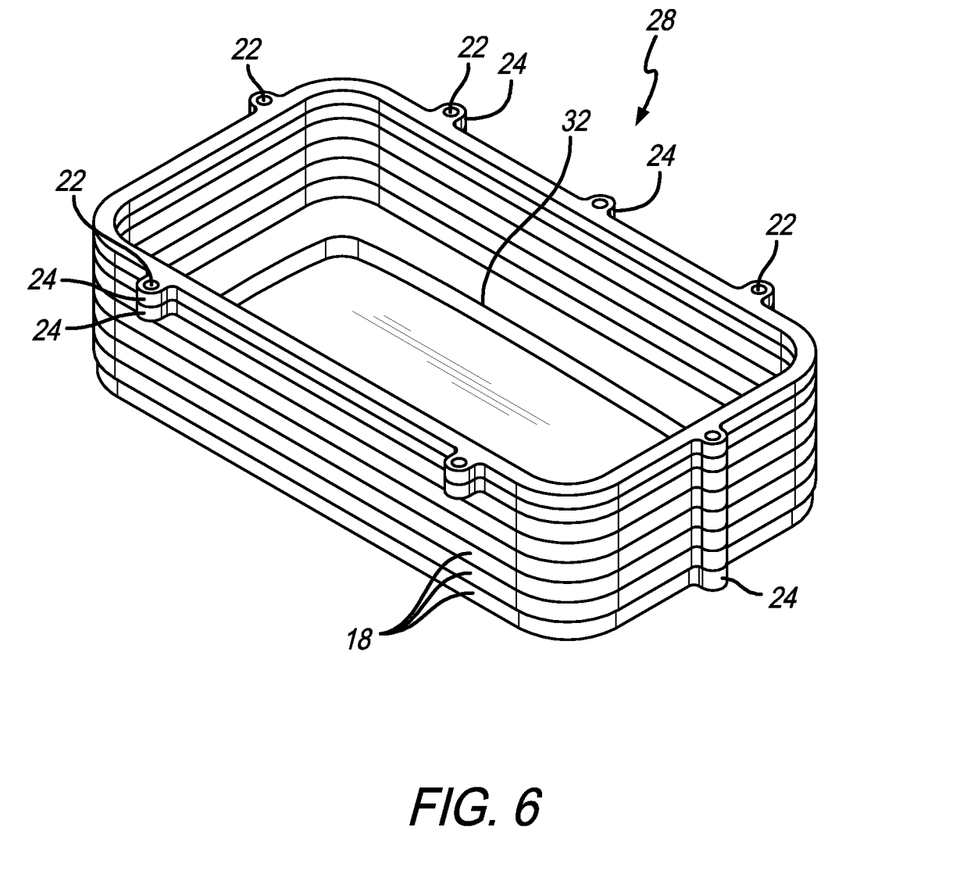
FIG. 6 is a perspective view of a stack assembly of the sink.
Figure 7:
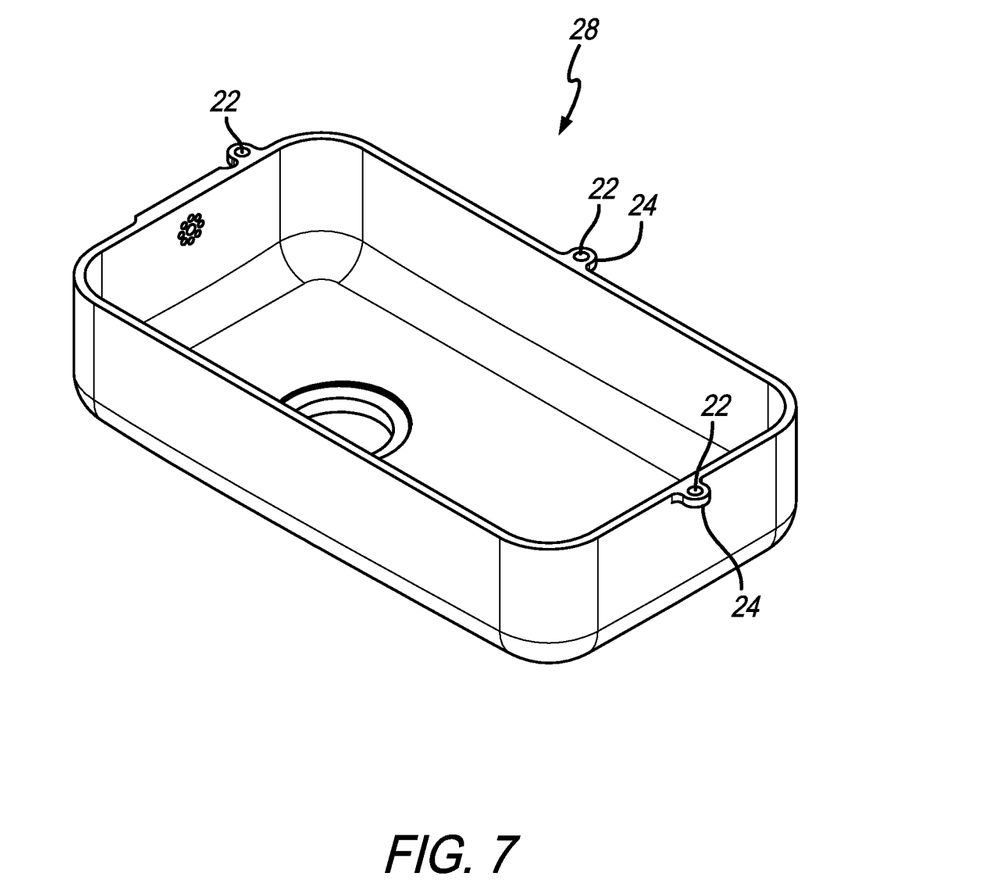
FIG. 7 is a perspective view of a finished assembly of the sink.
Figure 10:
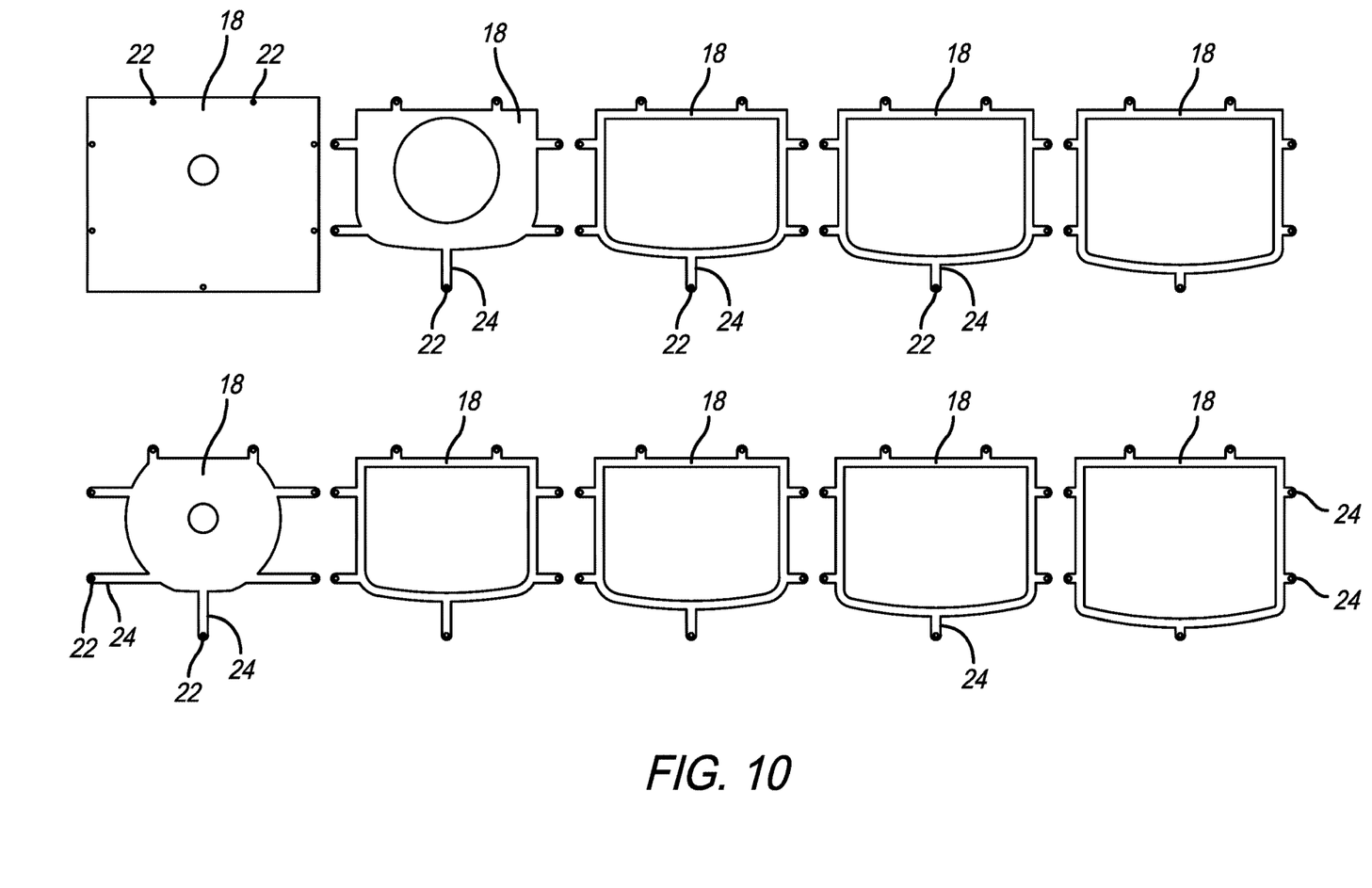
FIG. 10 is a top plan view of a plurality of layers used for making a sink in accordance with another preferred embodiment of the present invention.
Figure 11:
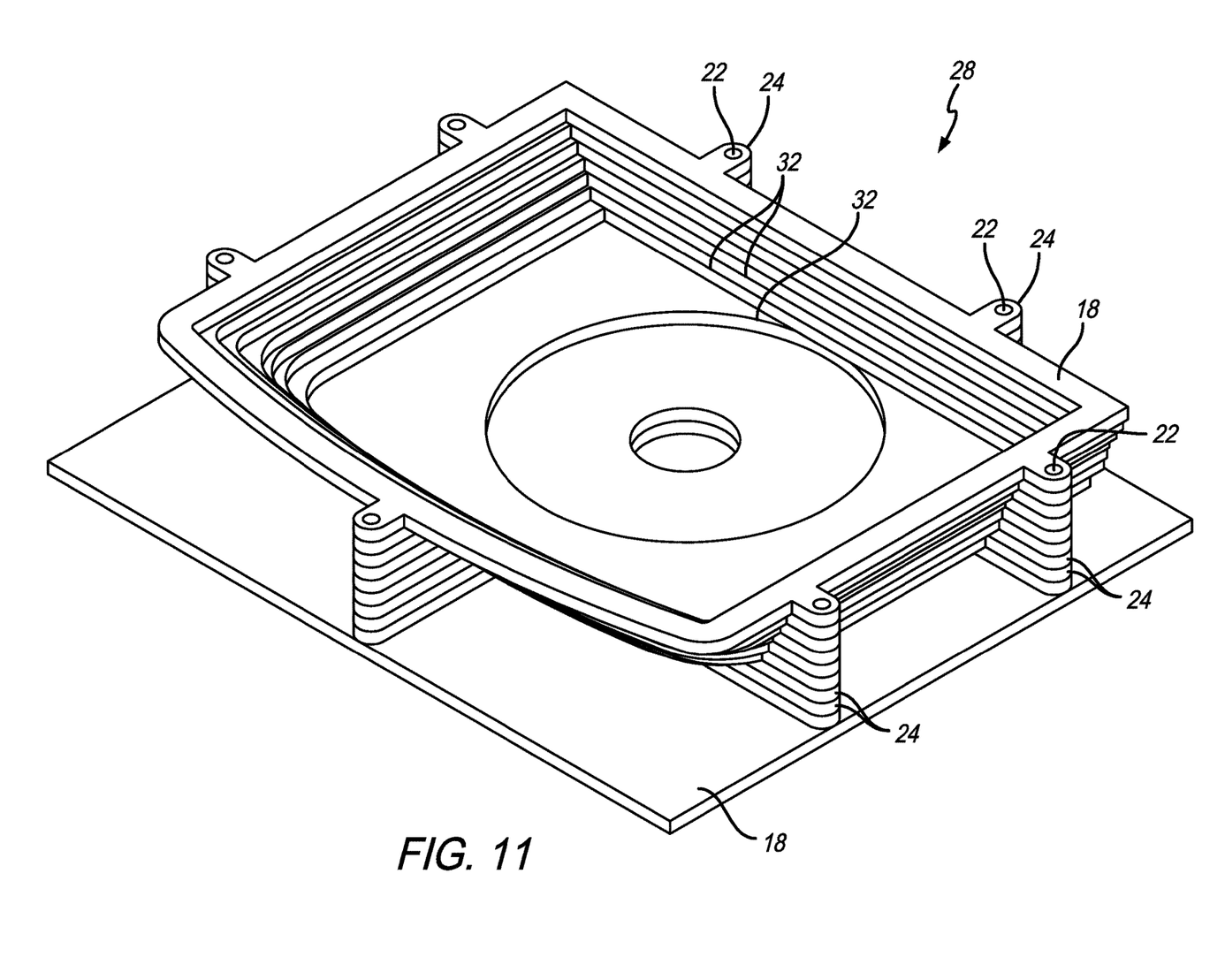
FIG. 11 is a perspective view of a stack assembly of the sink of FIG. 10.
Figure 12:
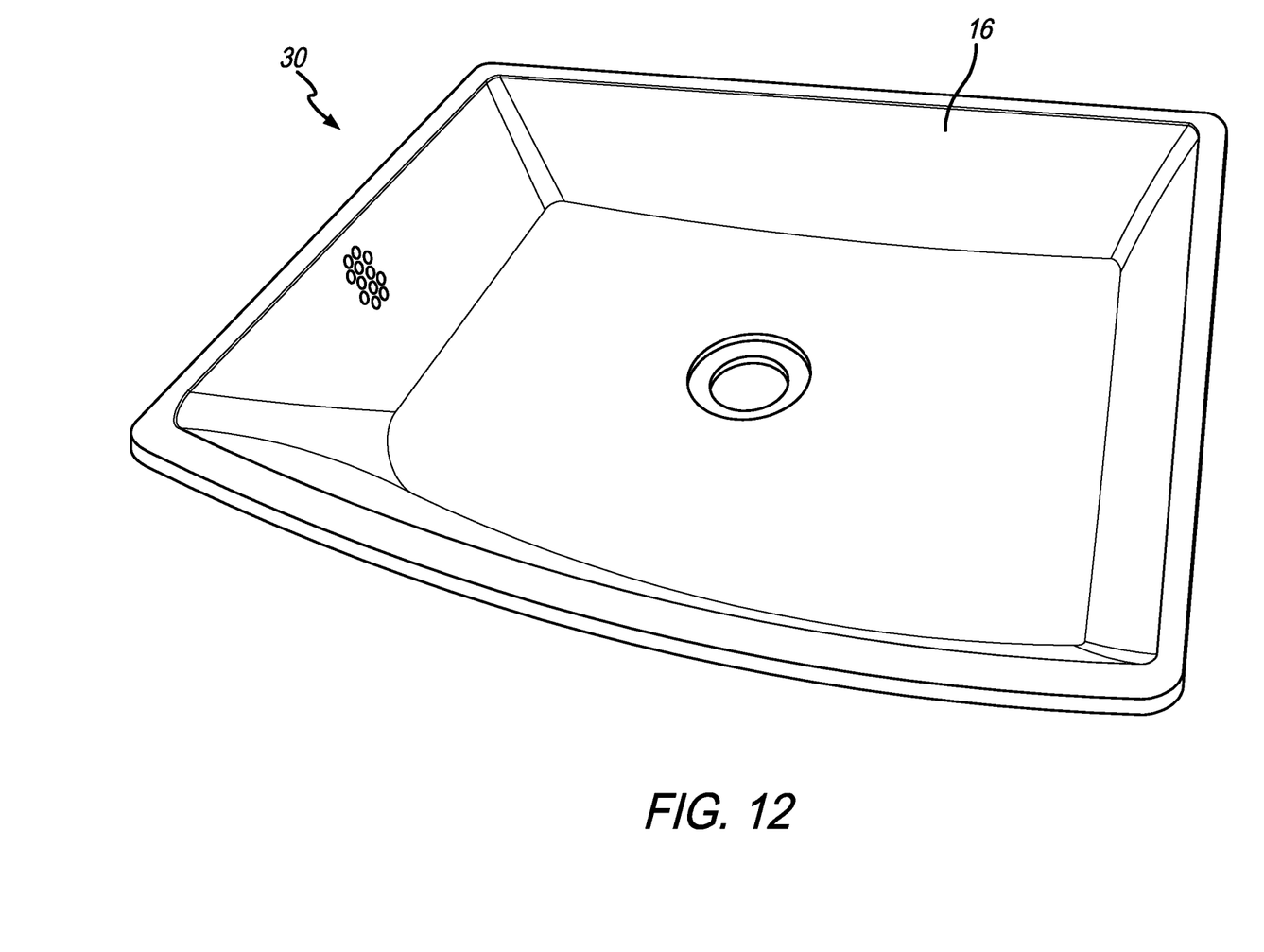
FIG. 12 is a perspective view of a finished assembly of the sink of FIG. 10.

FIGS. 1-4 show at least some of the steps in creating the countertop 12 and backsplash 14, FIGS. 5-7 show at least some of the steps in creating the sink 16 and FIGS. 10-12 show at least some of the steps in creating another sink 16. As shown in FIG. 1-2, each of the backsplash 14 and countertop 12 are comprised of a plurality of layers 18 (FIG. 2) that are machined, cut, or otherwise divided from a sheet of material 20 (FIG. 1). In another embodiment, the various layers can be machined from more than one sheet. In another embodiment, the various layers can created from a mold. Each layer 18 includes one or more alignment openings 22 that are defined in an alignment member 24 that extends outwardly in a lateral or longitudinal direction from the layer. As shown in FIG. 2, the layers can be different shapes. For example, there can be layers 18 that are strip members 18*a* and layers 18 that are panel members 18*b*.

Next, an adhesive, glue, bonding agent or other substance that can secure the layers 18 together is disposed on the appropriate surfaces of adjacent layers 18 and the layers are then stacked on one another. The corresponding alignment openings 22 and alignment members 24 are then aligned with one another and alignment rods 26 are inserted through the alignment openings 22 to keep the layers 18 in proper alignment or orientation. It will be appreciated that the order of the alignment steps can be done in a different order. For example, the alignment rods 26 can be inserted through the alignment openings 22 in a first layer 18 and then the other layers 18 can be stacked on top by placing the alignment rods into the alignment openings in a second layer 18, then placing the second layer on top of the first layer 18 and then repeating these steps for the remaining layers.

After all the layers 18 are stacked, the adhesive is allowed to dry such that they are bonded together, thereby creating a stack assembly 28, as shown in FIG. 3. The alignment rods 26 are removed from the alignment openings 22. Next, the stack assembly is machined and polished to smooth out the layers and edges. In other words, some of the outer surfaces or the layers are machined down to create a smooth surface (compare the outer surfaces in FIGS. 3 and 4). During the machining process, in a preferred embodiment, some or all of the alignment openings 22 and alignment members 24 are removed. FIG. 7 shows the sink 16 with some alignment members 24 and alignment openings 22 remaining (for alignment with the countertop, as described below) and FIG. 12 shows the sink 16 with all of the alignment members and alignment openings 22 removed. The machined and polished stack of layers are referred to herein as a finished assembly 30. A stack of alignment members that have been polished are referred to herein as an alignment column. For example, see FIG. 8 and the alignment columns 50 on the inside thereof.

It will be appreciated by those of ordinary skill in the art, that during the machining process, square portions or edges can be removed to provide a smooth surface. For example, see square portion 32 in FIG. 6 that has been removed in FIG. 7 to create the smooth sink bowl. As shown in FIGS. 10-12, in other instances, a plurality of layers that are stacked in series can include increasing or decreasing geometries of dimensions with a series of squared portions 32 (see FIG. 11). When these series of squared portions 32 are machined they provide an inclined or curved surface (see FIG. 12). As shown in the drawings, the different layers 18 can include be a series that include openings therein to provide the upwardly extending walls of the sink and solid layers that become the bottom of the sink.

Figure 8:
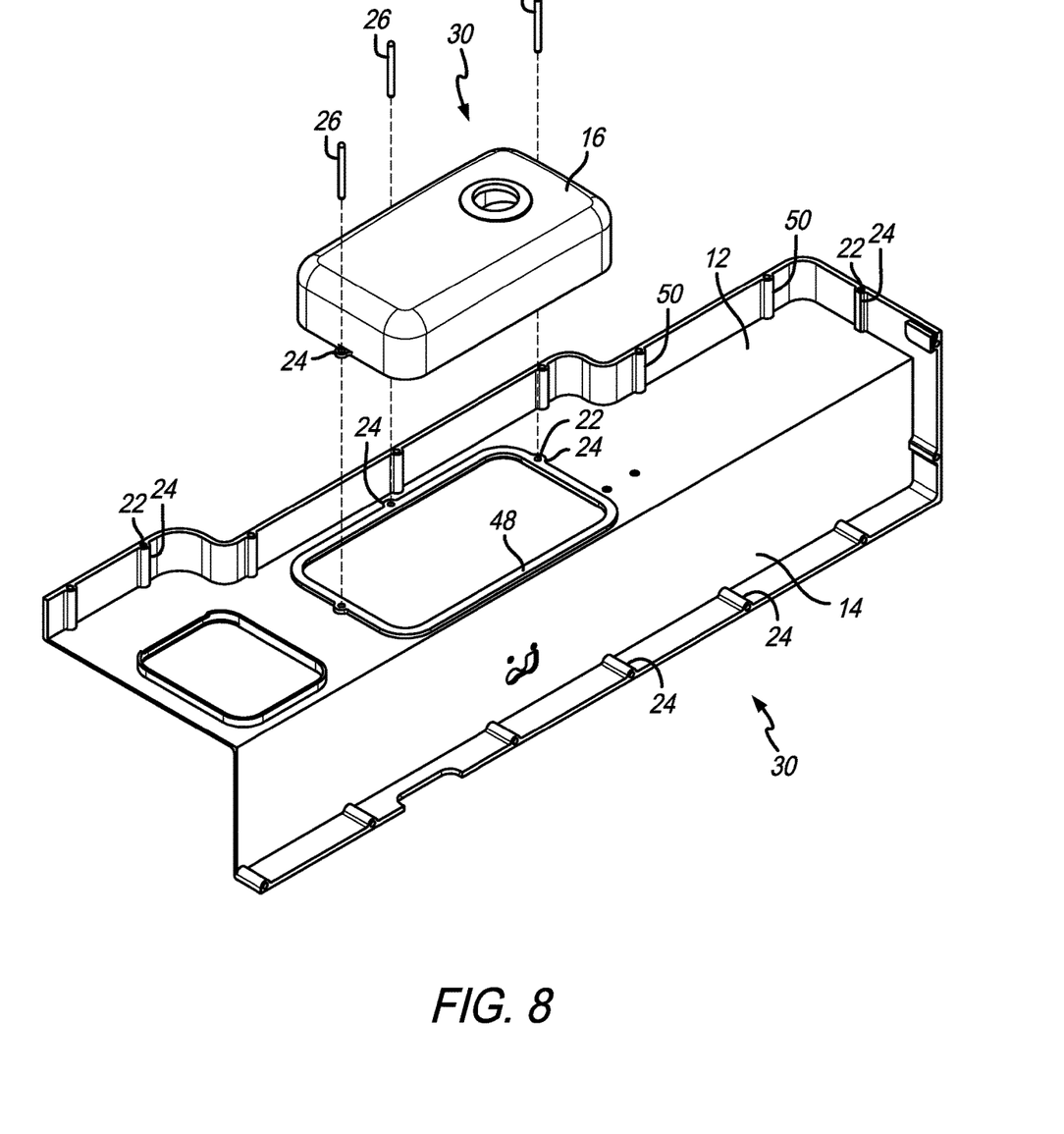
FIG. 8 is an exploded view of the finished assembly of the sink and the finished assembly of the countertop and backsplash assembly prior to being secured together.
Figure 9:
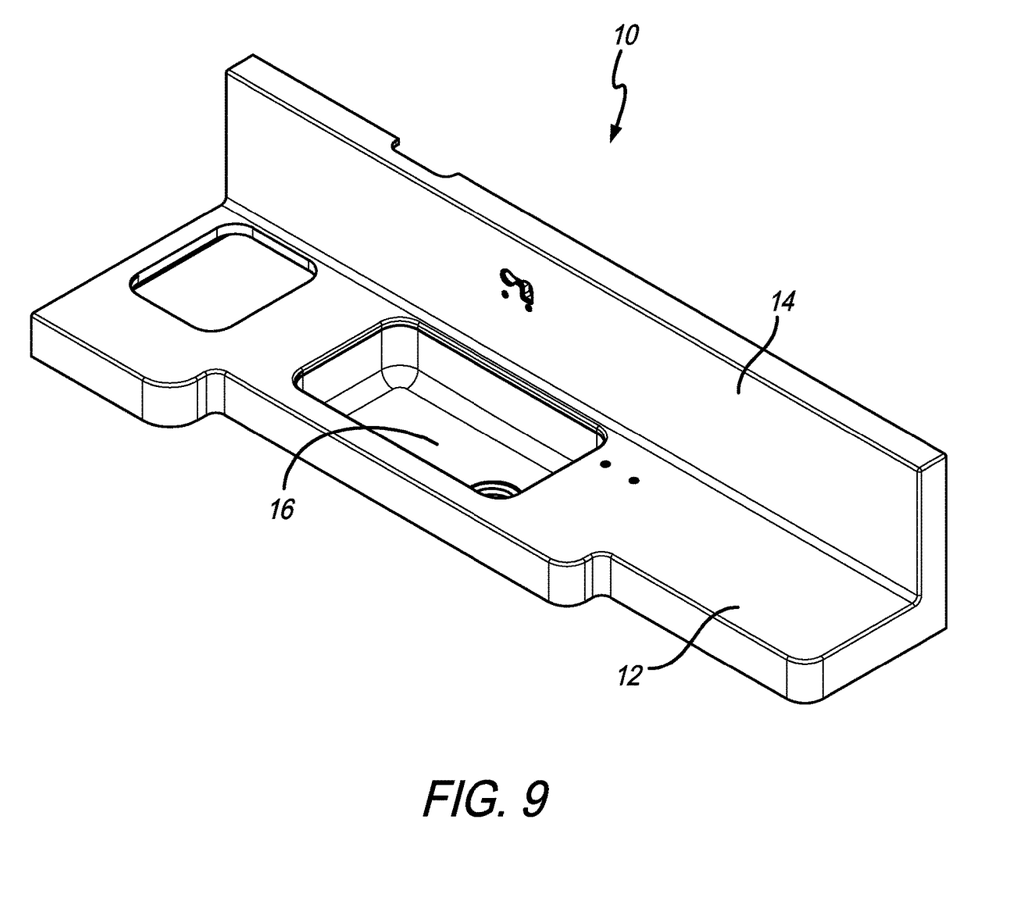
FIG. 9 is a perspective view of the countertop assembly.

FIGS. 8 and 9 show another aspect of the present invention where more than one finished assembly 30 can be secured to one another to provide the final article of manufacture. In the exemplary embodiment shown in the drawings, the finished countertop assembly 10 includes the countertop 12 with the sink 16 secured thereto. In a preferred embodiment, the countertop 12 includes a sink rim 48 on a bottom surface thereof. The sink rim 48 surrounds a sink opening 46. The sink rim 48 can be a separate layer 18 that is part of the stacking process or the sink rim 48 can be machined into the countertop layer 42. The sink rim 48 includes at least one and preferably a plurality of alignment members 24 and alignment openings 22 that correspond to the remaining alignment members 24 and alignment openings 22 in the finished assembly 30 of the sink 16. In another embodiment, the rim can be omitted and the alignment openings 22 can be defined directly in the countertop layer 42. Alignment rods 26 are placed in the alignment openings 22 of the sink 16 and the alignment openings of the sink rim 48 and the two components are bonded together using adhesive.

As discussed above, in a preferred embodiment, some of the alignment members and openings are removed during the machining process and some are left on the sink so that they can be aligned with alignment members and openings on the countertop. In other words, there are originally a first number of alignment members on the sink or first stack assembly and, when the first finished assembly is created there are a second number of alignment members, where the second number is less than the first number. The second number of alignment members (or alignment columns) matches the number of corresponding alignment members or openings on the second finished assembly (e.g., see the three alignment members and openings in FIG. 8).

With reference to the specific embodiment shown in FIGS. 2-4, the countertop 12 layers 18 include a plurality of front bullnose layers 32 and the backsplash 14 include a plurality of top flange layers 34. The assembly also includes a radius body 36, for where the countertop 12 and backsplash meet 14, a waste flap layer 38, the countertop layer 42 and a backsplash layer 44. The waste flap layer 38 is secured adjacent a waste opening 40 defined in the countertop layer 42.

After the finished assemblies are created the components can be coated, sanded or otherwise finished as desired. It will be appreciated that any material that is capable of being machined is within the scope of the present invention. For example, the layers can be made of Corian® or similar substances.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A method of making an article of manufacture, the method comprising the steps of:
    (a) obtaining at least first and second layers, wherein the first layer includes a main body portion and at least first and second alignment members extending outwardly from the main body portion, wherein the first layer includes at least first and second alignment openings defined in the first and second alignment members, respectively, wherein the second layer includes a main body portion and at least first and second alignment members extending outwardly from the main body portion, and wherein the second layer includes at least a first and second alignment openings defined in the first and second alignment members, respectively,
    (b) disposing adhesive onto at least one of an upper surface of the first layer or a bottom surface of the second layer,
    (c) stacking the second layer on the first layer,
    (d) aligning the first alignment opening on the first layer with the first alignment opening on the second layer and aligning the second alignment opening on the first layer and the second alignment opening on the second layer,
    (e) inserting a first alignment rod through the first alignment opening in the first layer and the first alignment opening in the second layer and inserting a second alignment rod through the second alignment opening in the first layer and the second alignment opening in the second layer,
    (f) allowing the adhesive to dry to form a first stack assembly,
    (g) machining the first stack assembly such that at least one of the first alignment member in the first layer, the first alignment member in the second layer, the second alignment member in the first layer or the second alignment member in the second layer is removed from the first stack assembly, and
    (h) machining the first stack assembly to remove at least a portion of a surface of the first layer and at least a portion of a surface of the second layer to polish the portions of the surfaces of the first and second layers to form a first finished assembly.

2. The method of claim 1 further comprising the steps of:
    obtaining at least third and fourth layers, wherein the third layer includes at least first and second alignment openings defined therein, and wherein the fourth layer includes at least a first and second alignment openings defined therein,
    disposing adhesive onto at least one of an upper surface of the third layer or a bottom surface of the fourth layer,
    stacking the fourth layer on the third layer,
    aligning the first alignment opening on the third layer with the first alignment opening on the fourth layer and aligning the second alignment opening on the third layer and the second alignment opening on the fourth layer,
    inserting a third alignment rod through the first alignment opening in the third layer and the first alignment opening in the fourth layer and inserting a fourth alignment rod through the second alignment opening in the third layer and the second alignment opening in the fourth layer,
    allowing the adhesive to dry to form a second stack assembly, and
    machining the second stack assembly to remove at least a portion of a surface of the third layer and at least a portion of a surface of the fourth layer to form a second finished assembly, and
    securing the first finished assembly to the second finished assembly.

3. The method of claim 2 wherein the second finished assembly includes a rim extending outwardly from a bottom surface thereof, and wherein the third alignment opening is defined in the rim.

4. The method of claim 2 wherein the first finished assembly is a sink and the second finished assembly is a countertop.

5. The method of claim 1 further comprising the steps of obtaining a sheet of material, and dividing the sheet of material into the at least first and second layers.

6. The method of claim 1 wherein the portion of the surface of the first layer that is machined in step (h) is separate from the first and second alignment members, and wherein the portion of the surface of the second layer that is machined in step (h) is separate from the first and second alignment members.

* * * * *